(12) United States Patent
Cho et al.

(10) Patent No.: US 7,599,724 B2
(45) Date of Patent: Oct. 6, 2009

(54) PORTABLE TERMINAL HAVING SLIDING CASE

(75) Inventors: Jin-woo Cho, Seongnam-si (KR); Jun-tai Kim, Yongin-si (KR); Sangchul Ko, Seoul (KR); Young-tae Kim, Seongnam-si (KR); Jung-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 11/390,202

(22) Filed: Mar. 28, 2006

(65) Prior Publication Data

US 2006/0240881 A1    Oct. 26, 2006

(30) Foreign Application Priority Data

Apr. 25, 2005    (KR)    ...................... 10-2005-0034016

(51) Int. Cl.
*H04W 88/02*    (2009.01)
*H04M 1/03*    (2006.01)

(52) U.S. Cl. .................................... 455/575.4; 455/350
(58) Field of Classification Search ....................... None
See application file for complete search history.

(56) References Cited

U.S. PATENT DOCUMENTS 6,934,568 B2 *    8/2005    Charlier et al. ............ 455/90.3

* cited by examiner

*Primary Examiner*—Philip J Sobutka
(74) *Attorney, Agent, or Firm*—Sughrue Mion, PLLC

(57) ABSTRACT

A portable terminal includes: a body case including a button operation unit and a circuit unit; at least one sliding case which is sildably connected to the body case to protrude from the body case and in which a closed resonance space is formed when the sliding case protrudes; and at least one speaker which is installed in the sliding case and is placed in the resonance space when the sliding case protrudes. Accordingly, since the resonance space is formed in the sliding case, the quality of sound provided from the speakers to a user is enhanced.

26 Claims, 7 Drawing Sheets

PORTABLE TERMINAL HAVING SLIDING CASE

CROSS-REFERENCE TO RELATED PATENT APPLICATIONS

This application claims priority from Korean Patent Application No. 10-2005-0034016, filed on Apr. 25, 2005, in the Korean Intellectual Property Office, the disclosure of which is incorporated herein in its entirety by reference.

BACKGROUND OF THE INVENTION

1. Field of the Invention

The present invention relates to a portable terminal and, more particularly, to a portable terminal with a structure improved to enhance sound quality transmitted from a speaker to a user.

2. Description of the Related Art

Various portable terminals such as mobile phones, personal digital assistants and smart phones that can be used as mobile phones and personal digital assistants have been developed. Recently, such portable terminals include more functions and can be used not only as for voice phone calls, or for sending/receiving data and, managing high-capacity personal information, but also for playing various multimedia files such as music and moving pictures.

A portable terminal that can be used for voice phone calls and for playing multimedia files includes a speaker for transmitting sounds to a user correctly and clearly and providing the user with a satisfactory sound effect. Korean Patent Laid-open Gazette No. 2004-0054148 discloses such a speaker device comprising a speaker that protrudes from a front case such that an end of the speaker is inserted into a user's ear during the phone call so that sounds can be correctly and clearly transmitted to the user. However, according to the above, this device is mainly designed effectively to transmit sounds to the user during the phone call, and thus there is a limit in providing sounds reproduced from a multimedia file with adequate effects to the user.

Meanwhile, the conventional portable terminal generally does not have an additional space to install a resonator that amplifies sound waves generated by a speaker because the portable terminal is light and thin. As a result, there is a problem in that the user may hear sounds which are not accurately reproduced by the speaker, that is, the bass characteristics of the sound are lowered and treble is distorted.

SUMMARY OF THE INVENTION

An apparatus consistent with the present invention relates to a portable terminal in which a resonance space is formed in a sliding case to improve quality of sound provided from speakers to a user.

According to an aspect of the present invention, there is provided a portable terminal comprising: a body case including a button operation unit and a circuit unit; at least one sliding case which is slidably connected to the body case to protrude from the body case and in which a closed resonance space is formed when the at least one sliding case protrudes; and at least one speaker which is installed in the sliding case and is placed in the resonance space when the at least one sliding case protrudes.

One end of the at least one sliding case may be open and an end portion of the body case may be formed to be inserted into an inner space formed in the at least one sliding case through the open end of the at least one sliding case.

One end of the at least one sliding case may be open and insertion grooves may be formed in the body case along the open end of the sliding case such that the sliding case is inserted into the body case from the open end of the at least one sliding case.

There may be two sliding cases capable of sliding from each side of the body case.

The sliding cases may include individual open ends that are connected to corner portions of the body case and cutout grooves may be formed in the corner portions of the body case along sliding directions of the sliding cases to allow the body case to be inserted to an inner space of the sliding cases from the open ends of the sliding cases, respectively.

A separation prevention unit may be provided between each of the sliding cases and the body case to prevent each protruding sliding case from being separated from the body case.

A sealing member may be disposed between the sliding case and the body case to seal the resonance space when the sliding case is protruding from the body case.

A position fixing unit may provided between each of the sliding cases and the body case to fix a position of each sliding case before the sliding case protrudes from the body case and to maintain the sliding case in a protruding state after the sliding case protrudes from the body case.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE NON-LIMITING EMBODIMENTS OF THE INVENTION

Figure 1:
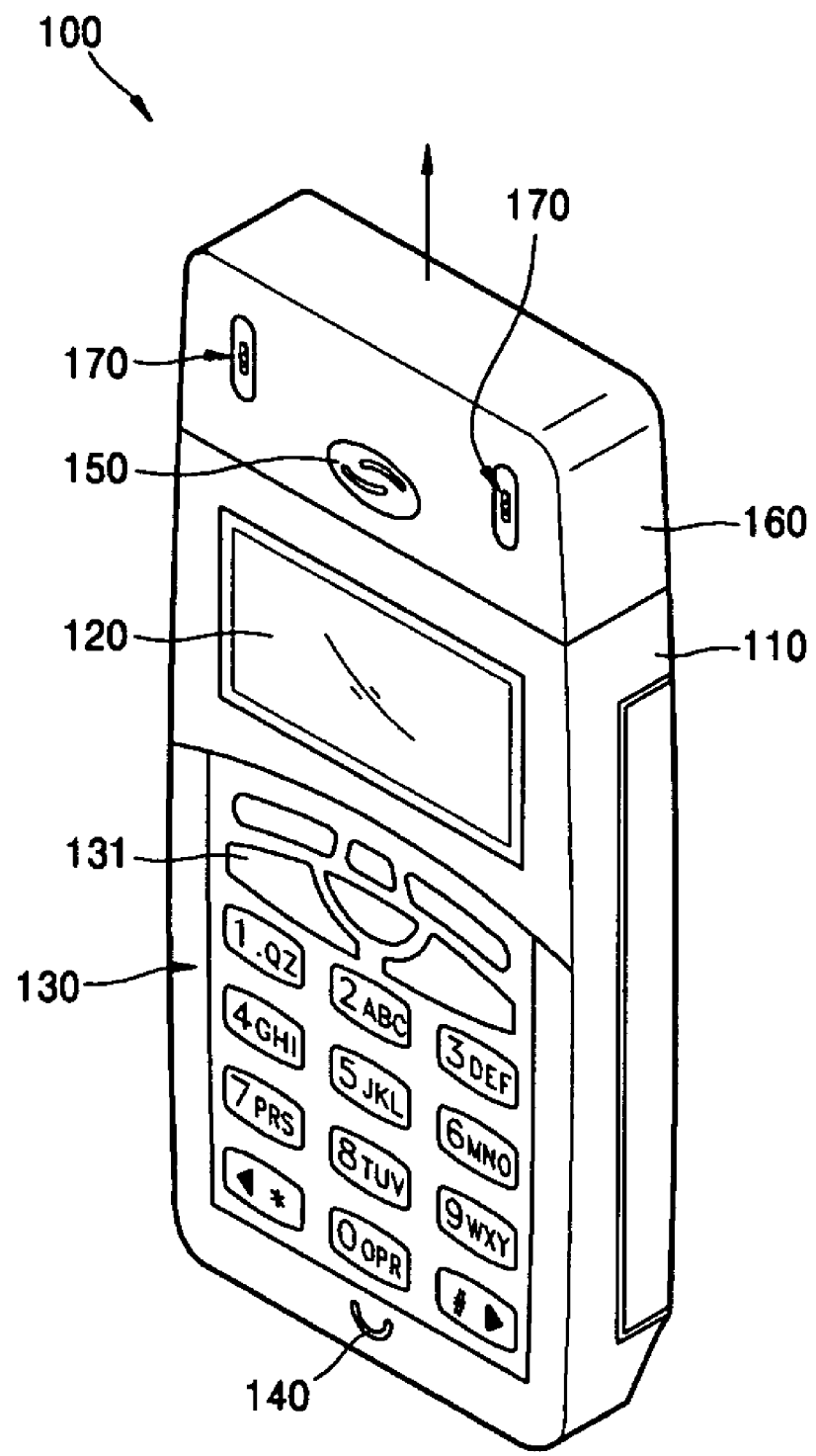
FIG. 1 is a perspective view of a portable terminal according to an embodiment of the present invention.

FIG. 1 is a perspective view of a portable terminal 100 according to an exemplary embodiment of the present invention.

Referring to FIG. 1, the portable terminal 100 is shown, for example as a mobile phone. The mobile phone 100 includes a body case 110, a screen unit 120 and a button operation unit 130, one surface of each of the screen unit 120 and the button operation unit 130 being exposed from the body case 110.

The screen unit 120 may be formed by a liquid crystal display (LCD) or an organic light emitting diode (OLED) to display characters, numbers, images, and moving pictures. The screen unit 120 is electrically connected to a circuit unit (not shown) installed in the body case 110.

The button operation unit 130 includes a plurality of input buttons 131 to allow the user to input a predetermined command to the circuit unit included in the body case 110. The input buttons 131 may include character buttons, a send button, an end button, a menu button, a cancel button, an OK button, and a button for a specific function. The button operation unit 130 may be placed below the screen unit 120 for the user's convenience, as illustrated in FIG. 1.

The screen unit 120 and the button operation unit 130 define the front side of the mobile phone 100 which the user sees and the rear side of the mobile phone 100 corresponds to the holdable part thereof.

A microphone 140 placed below the button operation unit 130 receives sound from the outside. The microphone 140 may be used to transmit a voice sound of a user to other party during a phone call or receive and record a sound from the outside. A receiver 150 which is disposed over the screen unit 120, that is, far from the microphone 140, transmits a sound from the inside of the mobile phone 100. The receiver 150 may be used to receive a voice sound of the other party or enable the user to listen to music.

A sliding case 160 is placed at an upper part of the body case 110. At least one or more speakers 170 are installed in the sliding case 160. As shown in FIG. 1, two speakers 170 are desirably installed at each side of the sliding case 160 for realizing a stereo sound effect, but the present invention is not limited thereto. Moreover, the speakers 170 are installed in the front side of the sliding case 160, as in FIG. 1, but can be installed in the rear side of the sliding case 160. The receiver 150 is placed in the center of the sliding case 160. However, since the receiver 150 only has to be placed at the upper part of the mobile phone 100, the receiver 150 may be placed at an upper part of the body case 110. Alternatively, when the speakers 170 are installed in the front side of the mobile phone 100, the receiver 150 may be omitted. When the receiver 150 is placed at an upper part of the body case 110, the sliding case 160 is advantageously placed over the body case 110 for convenience of design because the speakers 170 can become close to the receiver 150. However, the position of the sliding case 160 is not limited thereto.

The sliding case 160 is connected to the body case 110 to enclose an upper end of the body case 110 and protrude a predetermined length from the body case 110 by sliding in a direction indicated by an arrow.

Figure 2:
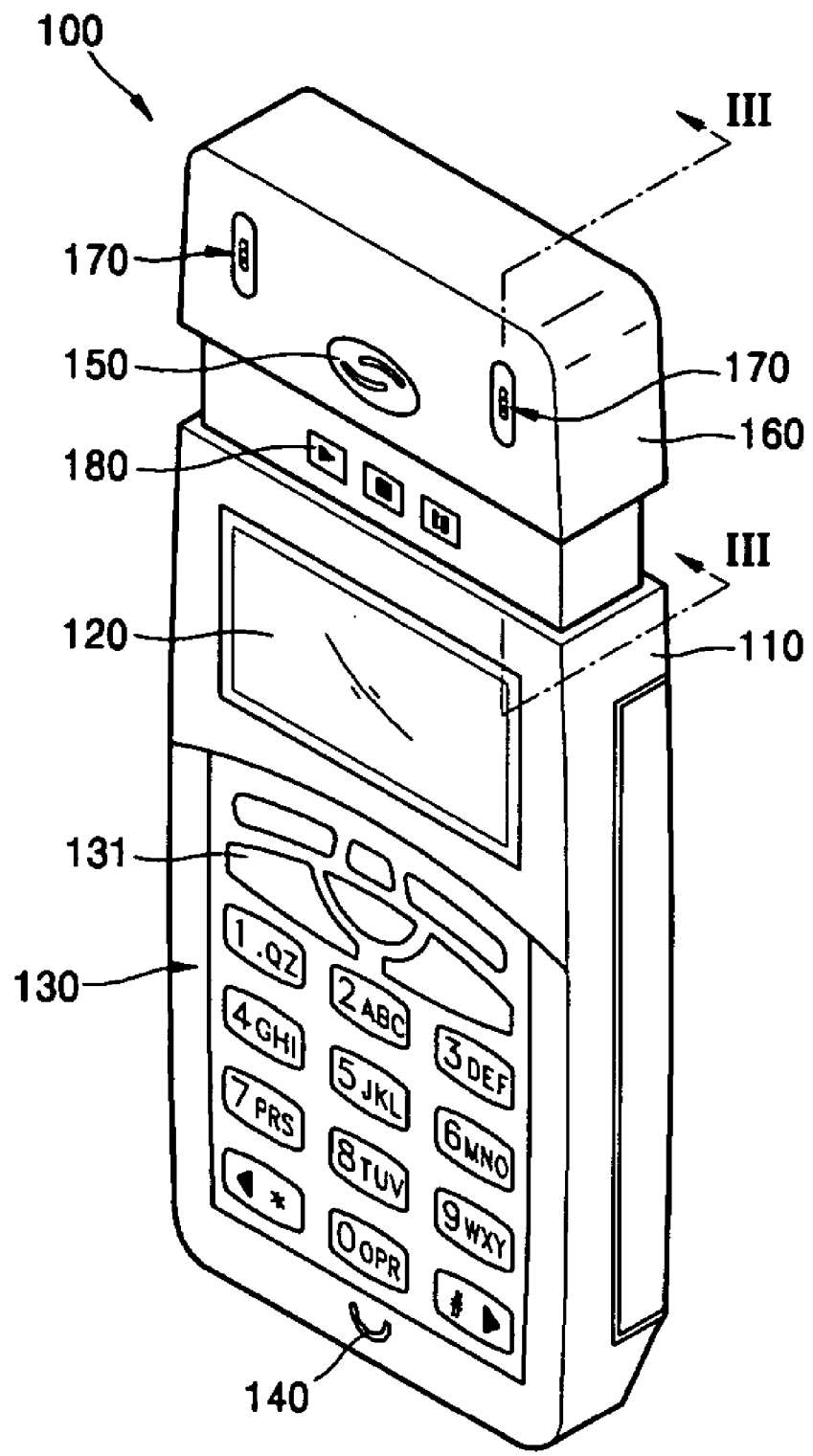
FIG. 2 is a perspective view of the portable terminal illustrated in FIG. 1 of which a sliding case is protruding.
Figure 3:
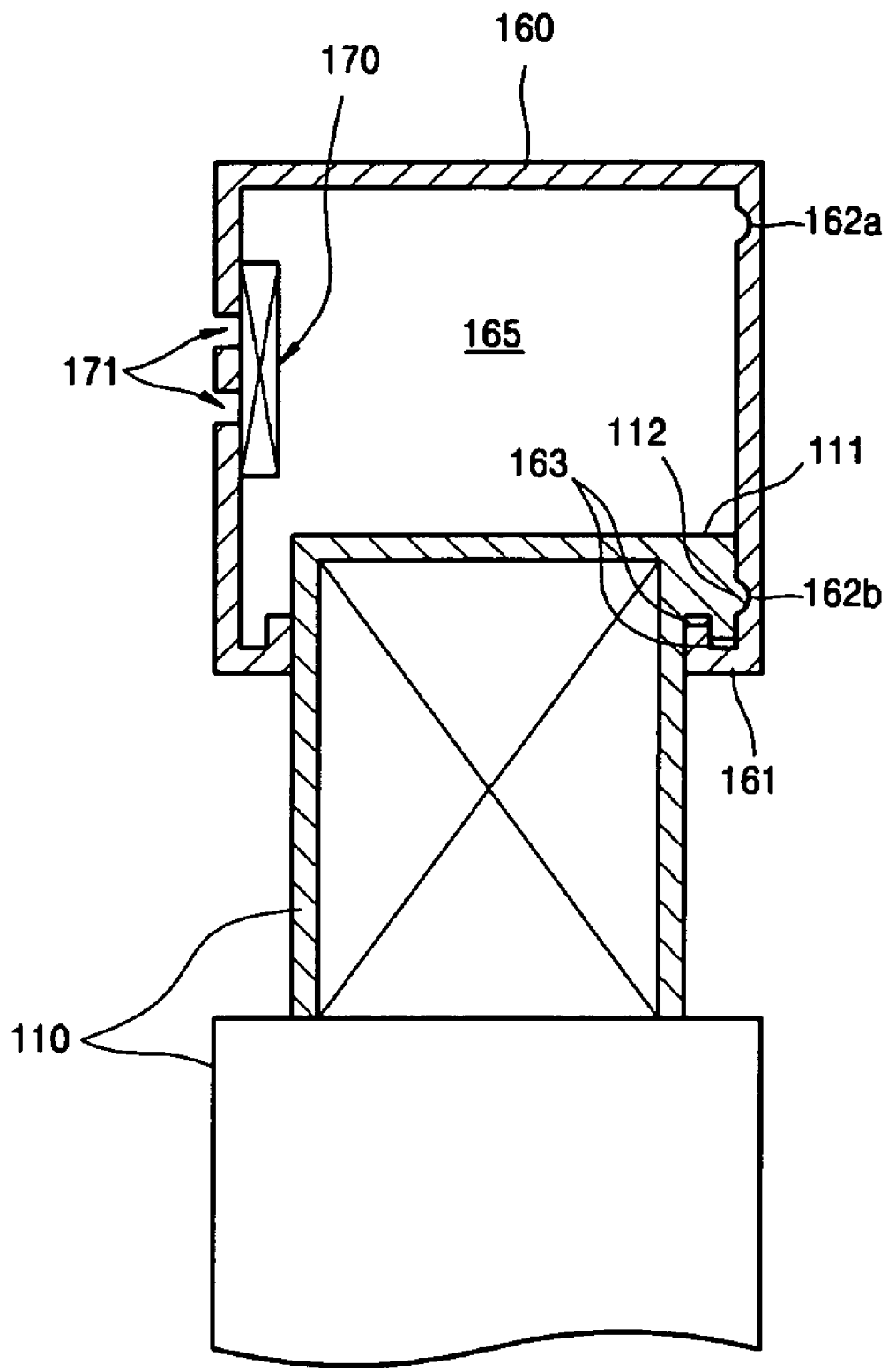
FIG. 3 is a cross-sectional view of the portable terminal taken along line—in FIG. 2.

FIG. 2 illustrates the sliding case 160 protruding upwardly from the body case 110, and FIG. 3 is a cross-sectional view taken along line—in FIG. 2.

Referring to FIGS. 2 and 3, the sliding case 160 has an inner space an end of which is open. That is, the upper end of the body case 110 is inserted into the open end of the sliding case 160, and the inner space is formed to receive the upper end of the body case 110. The sliding case 160 is connected to the body case 110 to slide along the body case 110 from the position where the inner top surface of the sliding case 160 touches the outer top surface of the body case 110 so that the sliding case 160 receives the upper end of the body case 110 when the sliding body 160 protrudes a predetermined length above the body case 110. Briefly, the sliding case 160 is connected to the body case 110 to slide up and down on the body case 110.

Meanwhile, the sliding case 160 may be formed such that no difference in height exists between the sliding case 160 and the body case 110 in a state where the sliding case 160 does not protrude from the body case 110 as shown in FIG. 1. To this end, as illustrated in FIG. 2, a part of the body case 110 which slides while being enclosed by the sliding case 160 may be formed to have a smaller periphery than the periphery of a remaining part of the body case 110 that is not enclosed by the sliding case 160 to the extent that a height difference does not occur between the two parts of the body case 110.

An empty space is generated in the sliding case 160 having the above structure when the sliding case 160 of which the inner top surface touches the outer top surface of the body case 110 protrudes upwardly from the body case 110. The empty space, which is closed, acts as a resonance space 165 for the speakers 170 installed in the sliding case 160. As illustrated in the drawings, when the speakers 170 are installed in the sliding case 160 to be placed at the empty space of the sliding case 160 when the sliding case 160 protrudes from the body case 110, sound waves generated from the speakers 170 can be amplified in the empty space. Accordingly, the empty space formed inside the sliding case 160 acts as the resonance space 162 for the speakers 170. Since the speakers 170 are placed inside the sliding case 160, the holes 171 are formed in portions of the sliding case 160 corresponding to the speakers 170 such that sounds generated from the speakers 170 can be transmitted to the outside.

As described above, because the sliding case 160 can form the resonance space 165 when the sliding case 160, of which inner top surface contacts the outer top surface of the body case 110, protrudes upwardly from the body case 110, sounds can be properly reproduced by the resonance space 165 according to the characteristics of the speakers 170. As a result, the sound characteristic, particularly, a bass characteristic of the speakers 170 is enhanced and transmitted to the user. The resonance space 165 is desirably formed to have a sufficient size. To this end, in a state before the sliding case 160 protrudes upwardly from the body case 110, as shown in FIG. 1, the sliding case 160 may be of a size such that the sliding case 160 is possibly closest to the screen unit 120 within a range that the screen unit 120 is not covered with the sliding case 160, but the size is not limited thereto.

The speakers 170 installed in the sliding case 160 may be operated or stopped by operation buttons 180 such as a play button for reproducing a sound, a stop button for stopping reproduction of sound, and a pause button for pausing the reproduction of sound. The operation buttons 180 may be installed on the body case 110. When installed on the body case 110, the operation buttons 180 may be placed to be hidden before the sliding case 160 protrudes, as illustrated in FIG. 1, and exposed when the sliding case 160 protrudes as illustrated in FIG. 2.

Between the sliding case 160 and the body case 110 there may be provided a separation prevention unit to prevent the sliding case 160 from being separated upwardly from the body case 110 when protruding from the body case 110. Examples of the separation prevention unit include, as shown in FIG. 3, a bent portion 161, which is bent inwardly from the open edge of the sliding case 160, and a clasp portion 111 which protrudes from the body case 110 and engages the bent portion 161 so that the sliding case 160 is prevented from being separated. The bent portion 161 of the sliding case 160 may be bent twice to be engaged with and fixed into a groove formed in the clasp portion 111. The bent portion 161 with the above structure more advantageously prevents the sliding case 160 from being separated from the body case 110.

The resonance space 165, which is created in the sliding case 160 when the bent portion 161 engages the clasp portion 111, is desirably maintained closed, and thus a sealing member 163 may be placed between the bent portion 161 and the clasp portion 111. The sealing member 163 may be a typical member such as rubber packing.

The sliding case 160 may be maintained so as not to protrude from the body case 110 until the sliding case is slidably moved from the body case 110 by an external force. To do this, between the sliding case 160 and the body case 110 there is provided a position fixing unit. As an example of the position fixing unit, as illustrated in FIG. 3, a fixing groove 162a is formed in a portion of the sliding case 160 which contacts the body case 110 before the sliding case 160 protrudes from the body case 110 and a fixing projection 112 is formed on an outer surface of the body case 110 that is inserted and fixed into the fixing groove 162a. However, the fixing groove 162a can be formed in the body case 110 and the fixing projection 112 can be formed on the sliding case 160, and thus the positions of the fixing groove 162a and fixing projection 112 are not limited to the above descriptions.

The position fixing unit may be formed on portions of the sliding case 160 and the body case 110 that face each other such that the sliding case 160 is maintained to protrude from the body case 110. In this case, if the fixing projection 112 of the body case 110 illustrated in FIG. 3 is used, another fixing groove 162b is formed on the sliding case 160 to enable the fixing projection 112 to be inserted and fixed into the fixing groove 162b.

When the sliding case 160 is placed such that the inner top surface of the sliding case 160 touches the outer top surface of the body case 110, the mobile phone 100 has a compact form and can be easily carried by the user. If the user slides the sliding case 160 above the body case 110, the resonance space 165 is formed in the sliding case 160, enabling high sound quality and adequate effect to be provided to the user during reproduction of music or moving pictures.

Figure 4:
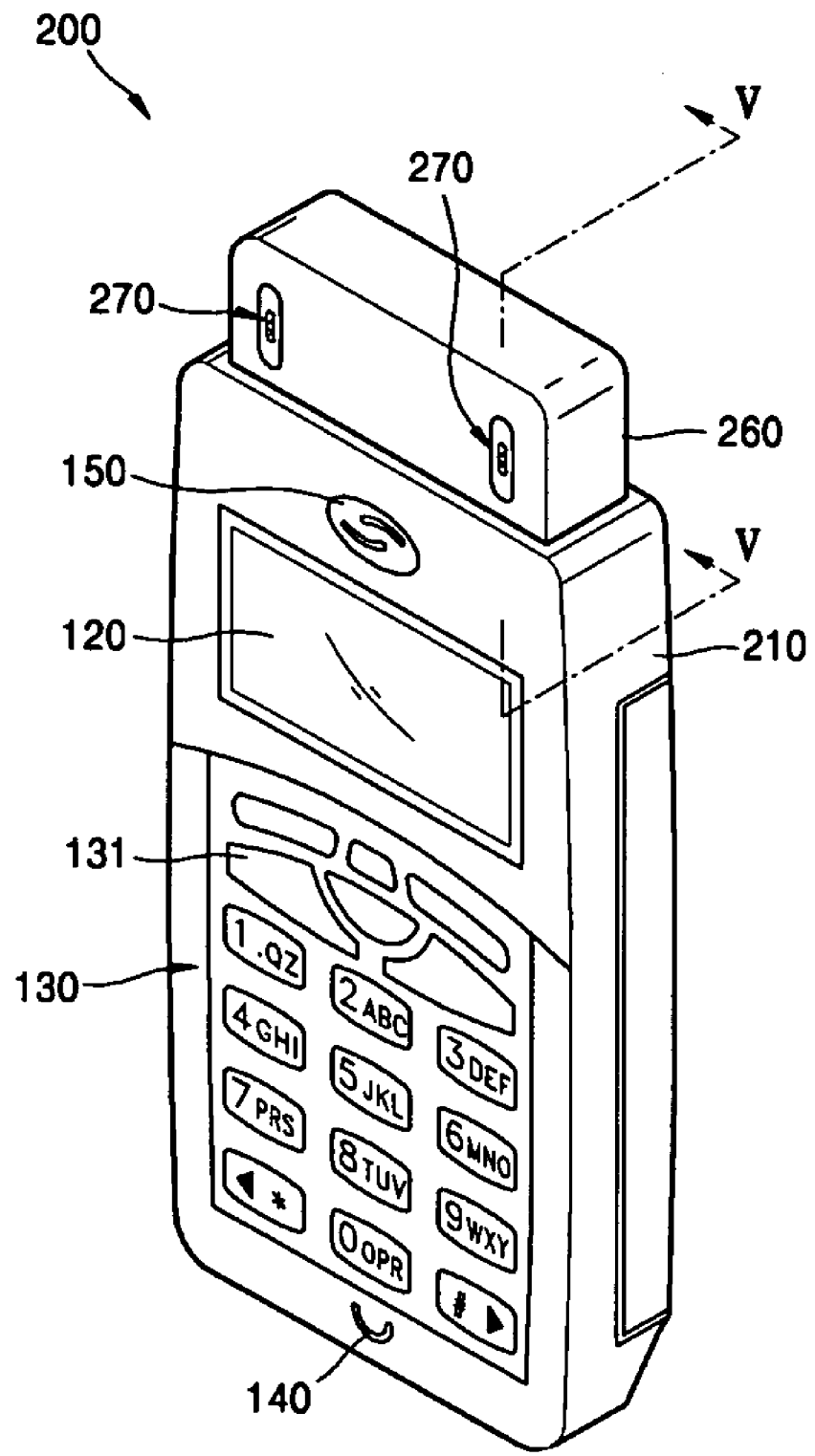
FIG. 4 is a perspective view of a portable terminal according to another embodiment of the present invention.
Figure 5:
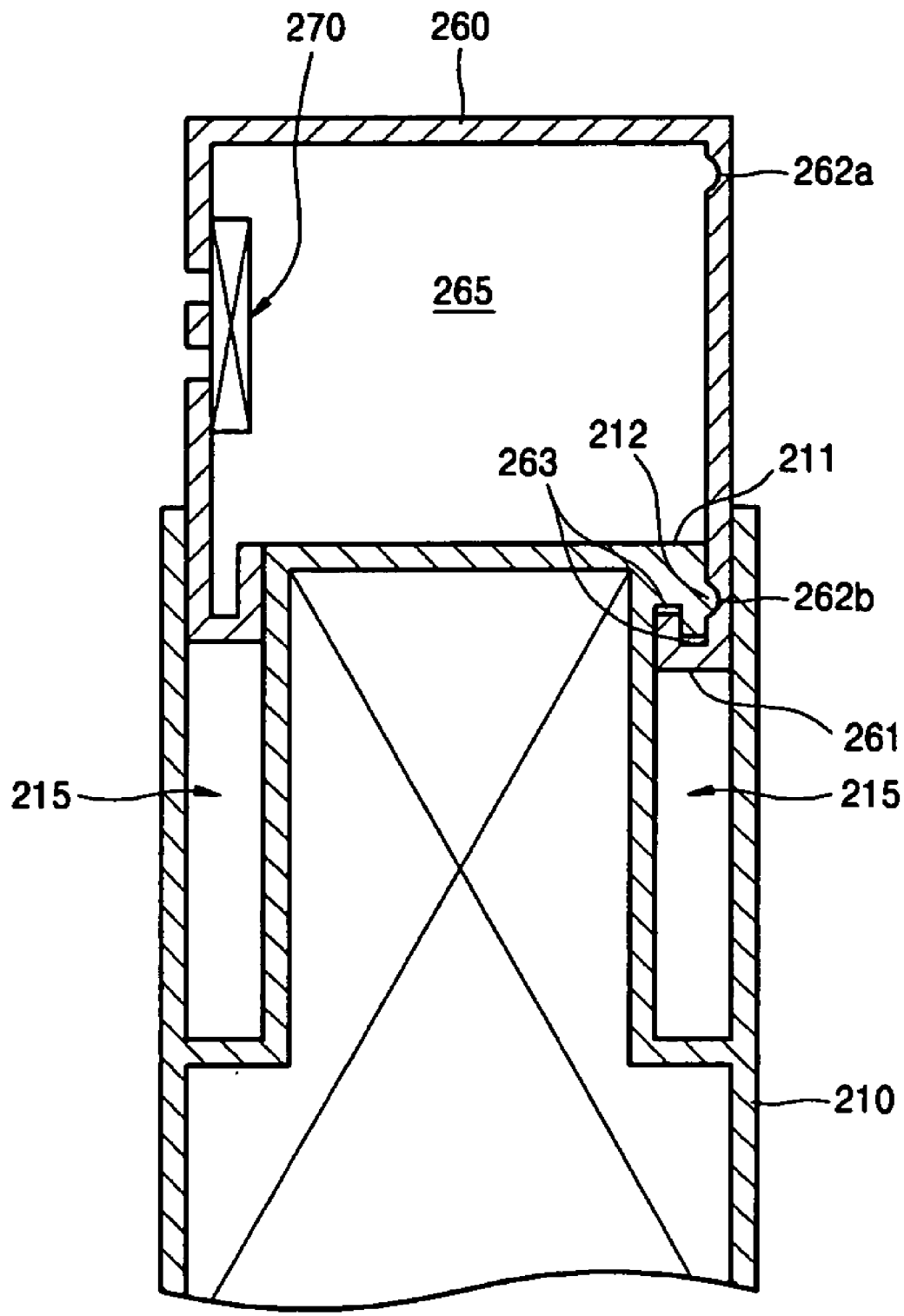
FIG. 5 is a cross-sectional view taken along ling V-V in FIG. 4.

FIG. 4 is a perspective view of a portable terminal 200 according to another exemplary embodiment of the present invention, and FIG. 5 is a cross-sectional view taken along line V-V in FIG. 4. The same reference numerals in FIGS. 4 and 5 and FIGS. 1-3 denote the same elements, and thus detailed descriptions of the elements are not repeated. In this embodiment, the differences from the above embodiment will be mainly described.

Referring to FIGS. 4 and 5, the portable terminal 200 is a mobile phone as in FIGS. 1 through 3. The mobile phone 200 includes a sliding case 260 having an inner space of which one end is opened and a body case 210 on an upper portion of which insertion grooves 215 are formed to allow the sliding case 260 to be inserted from the open end. Each insertion groove 215 is shaped such that an end fits the open end of the sliding case 260, that is, the insertion groove 215 is formed along the open end of the sliding case 260 to have a closed shape. Further, the insertion grooves 215 are formed to enable the sliding case 260 to be inserted along the sliding direction starting from the open end of the sliding case 260. The insertion grooves 215 are of a length which allows an inner top surface of the sliding case 260 to touch an outer top surface of the body case 210 placed in the sliding case 260. According to the present exemplary embodiment, the sliding case 260 is connected to the body case 210 to slide up and down with respect to the body case 210.

The sliding case 260 may be aesthetically formed such that no difference in height exists between the sliding case 260 and the body case 210 in a state before the sliding case 260 protrudes upwardly from the body case 210. To do this, the body case 210 may be formed such that the height of a portion of the body case 210 which is received by the inner space of the sliding case 260 is not greater than the height of the outermost portion of the body case 210.

The sliding case 260, when an inner top surface thereof touches the outer top surface of the body case 210, can slide upwardly to protrude a predetermined length above the body case 210.

Thus, a resonance space 265, as illustrated in FIG. 5, which amplifies sound waves generated by the speakers 270, may be formed in the sliding case 260. The speakers 270 are installed in the sliding case 260 so as to be placed in the resonance space 265 when the sliding case 260 protrudes upwardly from the body case 210. The speakers 270 may be formed at each side of the sliding case 260 to realize a stereo sound effect. The speakers 270 are disposed toward the front of the sliding case 260 in FIG. 5, but they can be disposed toward the back of the sliding case 260.

Between the sliding case 260 and the body case 210 there is provided a separation prevention unit to prevent the sliding case 260 which is protruding from the body case 210 from being separated from the body case 210. The separation prevention unit includes a bent portion 261 that is bent inwardly from the open edge of the sliding case 260 and a clasp portion 211 that protrudes from the outer surface of the body case 210 and engages the bent portion 261 to prevent the sliding case 260 from being separated from the body case 210. The bent portion 261 formed on the sliding case 260 is bent twice to be engaged with and fixed into a groove formed on the clasp portion 211, thus more effectively preventing the sliding case 260 from being separated from the body case 210. Between the bent portion 261 and the clasp portion 211 there may be provided a sealing member 263 such that the resonance space 265 formed in the sliding case 260 is maintained sealed when the bent portion 261 engages the clasp portion 211.

Until the sliding case 260 is sildably moved from the body case 210 by an external force, the sliding case 260 is desirably maintained so as not to protrude above the body case 210. To this end, between the sliding case 260 and the body case 210 there is provided a position fixing unit. The position fixing unit may include fixing grooves 262a and 262b and a fixing projection 212 that engages the fixing grooves 262a and 262b as described in FIGS. 1 through 3.

Figure 6:
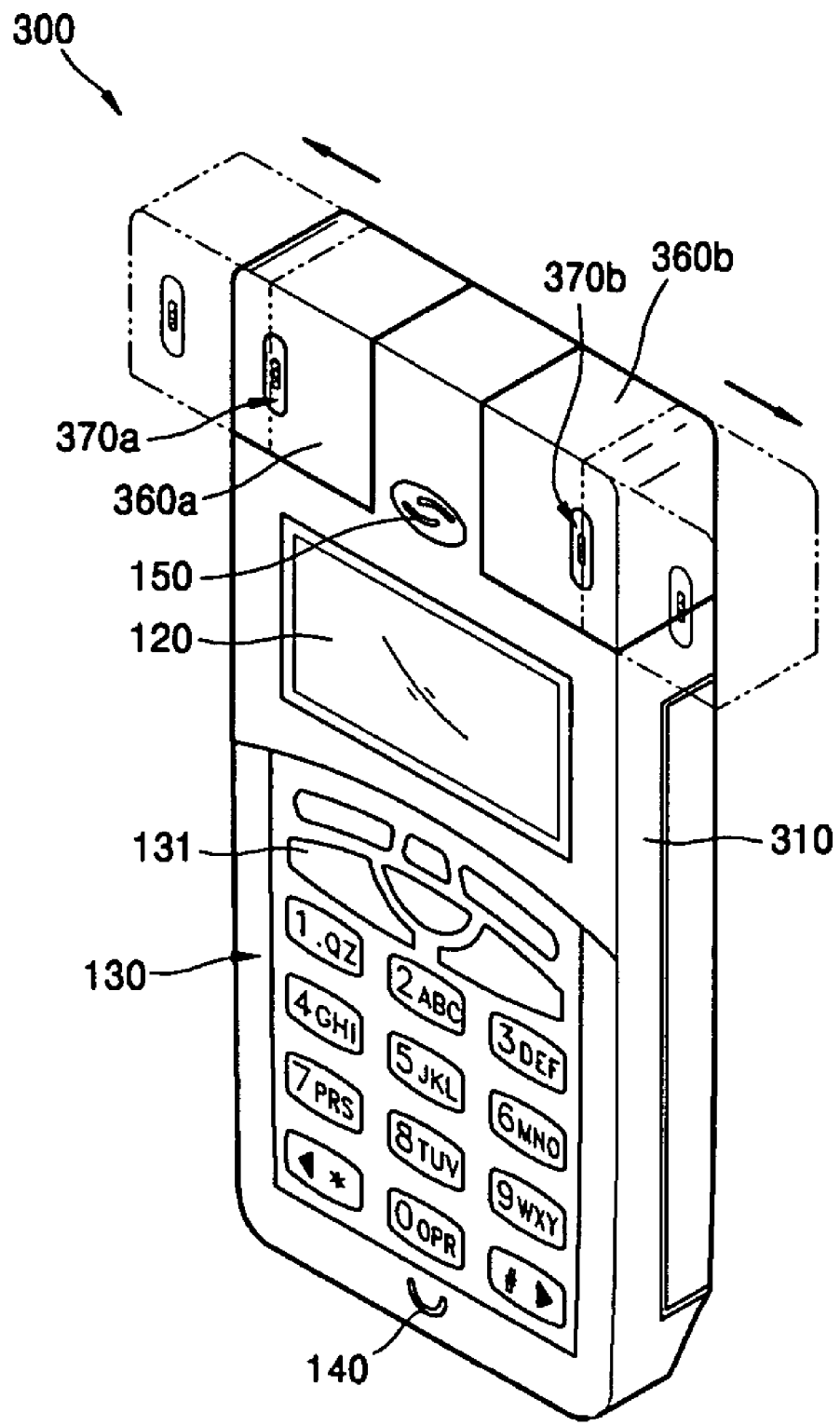
FIG. 6 is a perspective view of a portable terminal according to still another embodiment of the present invention.
Figure 7:
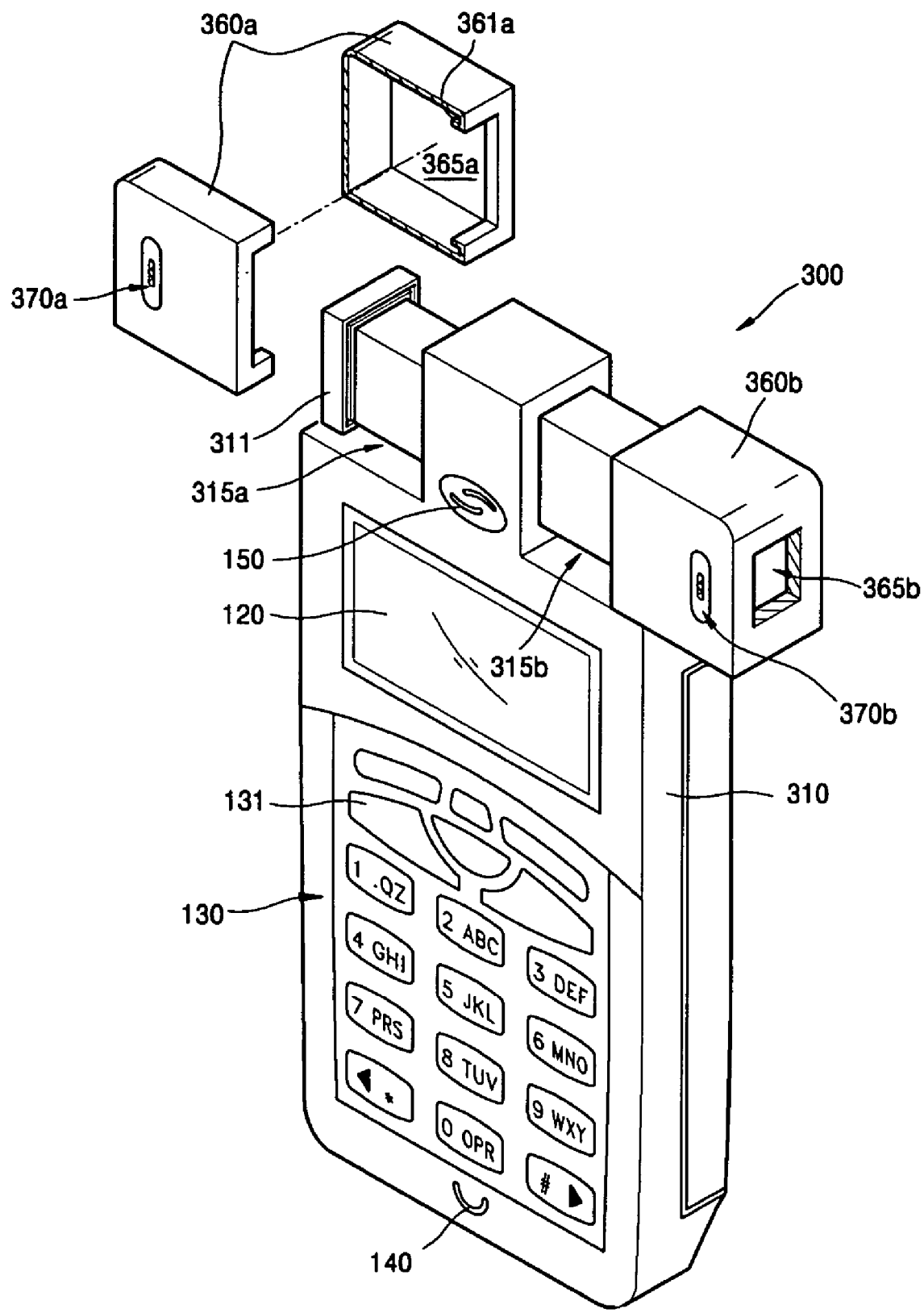
FIG. 7 is a partial exploded perspective view of the portable terminal illustrated in FIG. 6 of which sliding cases protrude from each side of a body case.

FIG. 6 is a perspective view of a portable terminal 300 according to a still further exemplary embodiment of the present invention, and FIG. 7 is a perspective view of the portable terminal at a state in which sliding cases 360a and 360b protrude outwardly from each side of a body case 310.

Referring to FIGS. 6 and 7, the portable terminal 300 is a mobile phone as in the above exemplary embodiments. The mobile phone 300 includes the left sliding case 360a and the right sliding case 360b which can protrude outwardly from each side of the body case 310. The left and right sliding cases 360a and 360b are symmetrical to each other. At least one left speaker 370a is installed in the left sliding case 360a and at least one right speaker 370b is installed in the right sliding case 360b. The left and right speakers 370a and 370b are disposed in the front side of the sliding cases 360a and 360b in FIG. 6, but can be disposed in the back side thereof. The left and right sliding cases 360a and 360b may be connected to each side of the body case 310 to respectively slide left and right (indicated by arrows) because stereo sound effects can be maximized when the protruding left and right sliding cases 360a and 360b are placed apart from each other.

As illustrated in the drawings, the left sliding case 360a may enclose and contain a left upper corner portion of the body case 310 and then slide left from the body case 310, and the right sliding case 360b may enclose and contain a right upper corner portion of the body case 310 and slide right from the body case 310. Each of the left and right sliding cases 360a and 360b has an inner space one end of which is opened. A left cutout groove 315a and a right cutout groove 315b are formed in the body case 310 along sliding directions of the left sliding case 360a and the right sliding case 360b, respectively. The left cutout groove 315a allows a part of the open end of the left sliding case 360a to be inserted thereinto when the left upper corner portion of the body case 310 is inserted into the sliding case 360a through the open end of the left sliding case 360a. The left cutout groove 315a is formed to a depth that allows the inner surface of the left sliding case 360a entirely to contact the outer surface of the left upper corner portion of the body case 310. The right cutout groove 315b is formed in the same way as the left cutout groove 315a. The left and right sliding cases 360a and 360b may be formed to be inserted into the body case 310 as the embodiment illustrated in FIGS. 4 and 5.

The left and right sliding cases 360a and 360b may be aesthetically formed such that no difference in height exists between the left and right sliding cases 360a and 360b and the body case 310 in a state before the left and right sliding cases 360a and 360b protrude to the left and right from the left upper corner portion and the right upper corner portion of the body case 310, respectively. To this end, the portions of the body case 310, which are enclosed by the left and right sliding cases 360a and 360b, are formed such that the heights of the portions are not greater than the remaining portion of the body case 310, which is not enclosed by either the left or right sliding case 360a or 360b.

The left and right sliding cases 360a and 360b in a compact form, that is, when the inner surfaces of the left and right sliding cases 360a and 360b touch the outer surfaces of both of the upper corner portions of the body case 310, respectively, slide to the left and right to protrude a predetermined length from the body case 310.

When the left and right sliding cases 360a and 360b protrude a predetermined length from the body case 310, a left resonance space 365a and a right resonance space 365b are formed in each of the left and right sliding cases 360a and 360b to amplify sound waves generated by the left and right speakers 370a and 370b, respectively. The left and right speakers 370a and 370b, which are installed in the respective left and right sliding cases 360a and 360b, are placed in the respective left and right resonance spaces 365a and 365b when the left and right sliding cases 360a and 360b slide left and right from the body case 310.

Since at least one speaker is installed in each of the left and right sliding cases 360a and 360b, stereo sound effects can be realized. When the left and right sliding cases 360a and 360b are apart from each other by sliding to the left and right from the body case 310, the stereo sound effects can be maximized, and thus an adequate effect can be provided to the user.

To prevent the protruding left sliding case 360a from being separated from the body case 310, a separation prevention unit is provided between the left sliding case 360a and the body case 310. The separation prevention unit, as illustrated in FIG. 7, includes a bent portion 361a that is inwardly bent from the edge of the open end of the left sliding case 360a and a clasp portion 311 that protrudes from the outer surface of the body case 310 and engages the bent portion 361a to prevent the left sliding case 360a from being separated from the body case 310. The bent portion 361a formed on the left sliding case 360a is bent twice to be engaged with and fixed into a groove formed on the clasp portion 311, thus more effectively preventing the left sliding case 360a from being separated from the body case 310. Between the right sliding case 360b and the body case 310 there is provide a separation prevention unit formed in the same fashion as the left sliding case 360a.

Between the respective left and right sliding cases 360a and 360b and the body case 310 there is provided a sealing member, as illustrated in FIGS. 3 and 5, to seal the left and right resonance spaces 365a and 365b when the left and right sliding cases 360a and 360b protrude from the body case 310.

Until the left and right sliding cases 360a and 360b are sildably moved from the body case 310 by an external force, the left and right sliding cases 360a and 360b are desirably maintained so as not to protrude from the body case 310, and once the left and right sliding cases 360a and 360b protrude from the body case 310, the left and right sliding cases 360a and 360b are desirably maintained in this state. To do this, between each of the left and right sliding cases 360a and 360b and the body case 310 there is provided a position fixing unit. The position fixing unit may be the same as the position fixing unit of the mobile phone 100 or 200.

Each of the sliding cases 160, 260, 360a and 360b according to the above exemplary embodiments is described in conjunction with the mobile phone 100, 200 and 300, but they can be applied to any portable terminal having a speaker system for reproduction of music or moving pictures.

As described above, consistent with the present invention, when a sliding case protrudes from a body case, a resonance space for a speaker is formed in the sliding case, thereby enabling sounds to be reproduced according to the characteristics of the speaker. Therefore, sound quality, especially bass sound quality is enhanced. When two sliding cases capable of protruding are connected on each side of the body case, stereo sound effects can be improved, and thus adequate effects can be provided to a user. Moreover, when not protruding from the body case, the sliding case is in a compact form, thereby allowing a user to easily carry the mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A portable terminal comprising:
   a body case including a button operation unit and a circuit unit;
   at least one sliding case which is slidably connected to the body case to protrude from the body case and forms a closed, empty void with the body case when the at least one sliding case protrudes, the empty void being a resonance chamber which amplifies sound produced therein; and
   at least one speaker which is installed in the resonance chamber formed by the sliding case and the body case when the at least one sliding case protrudes.

2. The portable terminal of claim 1, wherein one end of the at least one sliding case is open and an end portion of the body case is formed to be inserted into an inner space formed in the at least one sliding case through the open end of the at least one sliding case.

3. The portable terminal of claim 1, wherein a separation prevention unit is disposed between the at least one sliding case and the body case to prevent the protruding sliding case from being separated from the body case.

4. The portable terminal of claim 3, wherein the separation prevention unit includes a bent portion which is inwardly bent from the edge of the open end of the sliding case and a clasp portion which is formed on an outer surface of the body case and engages the bent portion.

5. The portable terminal of claim 4, wherein the bent portion is bent twice to engage a groove formed on the clasp portion.

6. The portable terminal of claim 4, wherein a sealing member is disposed between the bent portion and the clasp portion such that the resonance chamber is sealed when the bent portion engages the clasp portion.

7. The portable terminal of claim 1, wherein a position fixing unit is provided between the at least one sliding case and the body case to fix the at least one sliding case before the at least one sliding case protrudes from the body case and to maintain the at least one sliding case in a protruding state after the at least one sliding case protrudes from the body case.

8. The portable terminal of claim 1, wherein the position fixing unit includes a fixing groove formed in one of the at least one sliding case and the body case, and a fixing projection that is formed on the other case to fit into the fixing groove.

9. The portable terminal of claim 1, wherein the at least one speaker comprises a pair of speakers installed in each side of the at least one sliding case.

10. The portable terminal of claim 1, wherein the body case includes buttons for operating and stopping the at least one speaker installed in the at least one sliding case, and the buttons are hidden before the at least one sliding case protrudes from the body case and are exposed to the outside when the at least one sliding case protrudes.

11. The portable terminal of claim 1, wherein one end of the at least one sliding case is open and insertion grooves are formed in the body case along the open end of the sliding case such that the sliding case is inserted into the body case from the open end of the sliding case.

12. The portable terminal of claim 11, wherein a separation prevention unit is provided between the at least one sliding case and the body case to prevent the protruding sliding case from being separated from the body case.

13. The portable terminal of claim 11, wherein a sealing member is disposed between the at least one sliding case and the body case to seal the resonance chamber when the at least one sliding case is protruding from the body case.

14. The portable terminal of claim 11, wherein a position fixing unit is provided between the at least one sliding case and the body case to fix the at least one sliding case before the at least one sliding case protrudes from the body case and to maintain the at least one sliding case in a protruding state after the at least one sliding case protrudes from the body case.

15. The portable terminal of claim 1, wherein the body case further includes a screen unit for displaying an image.

16. The portable terminal of claim 15, wherein the body case further includes a microphone and a receiver for voice calling.

17. A portable terminal comprising:
a body case including a button operation unit and a circuit unit;
at least one sliding case which is slidably connected to the body case to protrude from the body case and in which a closed resonance space is formed when the at least one sliding case protrudes; and
at least one speaker which is installed in the sliding case and is placed in the resonance space when the at least one sliding case protrudes,
wherein the at least one sliding case comprises two sliding cases operative to slide from each side of the body case.

18. The portable terminal of claim 17, wherein the sliding cases include individual open ends that are connected to corner portions of the body case and cutout grooves are formed in the corner portions of the body case along sliding directions of the sliding cases to allow the body case to be inserted into an inner space of the sliding cases from the open ends of the sliding cases, respectively.

19. The portable terminal of claim 18, wherein a separation prevention unit is provided between each of the sliding cases and the body case to prevent each protruding sliding case from being separated from the body case.

20. The portable terminal of claim 18, wherein a sealing member is disposed between each of the sliding cases and the body case to seal the resonance space when each sliding case protrudes from the body case.

21. The portable terminal of claim 18, wherein a position fixing unit is provided between each of the sliding cases and the body case to fix each sliding case before the sliding case protrudes from the body case and to maintain the sliding case in a protruding state after the sliding case protrudes from the body case.

22. The portable terminal of claim 17, wherein one end of each of the sliding cases is open and insertion grooves are formed in each corner portion of the body case along the open end of the sliding case such that each sliding case is inserted into the body case from the open end of the sliding case.

23. The portable terminal of claim 22, wherein a separation prevention unit is provided between each of the sliding cases and the body case to prevent each protruding sliding case from being separated from the body case.

24. The portable terminal of claim 22, wherein a sealing member is disposed between each of the sliding cases and the body case to seal the resonance space when each sliding case protrudes from the body case.

25. The portable terminal of claim 22, wherein a position fixing unit is provided between each of the sliding cases and the body case to fix a position of each sliding case before the sliding case protrudes from the body case and to maintain the sliding case in a protruding state after the sliding case protrudes from the body case.

26. The portable terminal of claim 17, wherein each of the sliding cases includes at least one speaker.

* * * * *